US012566822B1

(12) United States Patent
    Ma

(10) Patent No.:     US 12,566,822 B1
(45) Date of Patent:         Mar. 3, 2026

(54) METHOD AND A SYSTEM FOR FEEDBACK FILTERING IN A MACHINE LEARNING MODEL

(71) Applicant: Honeywell International Inc., Charlotte, NC (US)

(72) Inventor: Xiaoxiang Ma, Atlanta, GA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 19/059,302

(22) Filed: Feb. 21, 2025

(51) Int. Cl.
    *G06F 16/00*      (2019.01)
    *G06F 16/28*      (2019.01)
    *G06F 18/2411*    (2023.01)

(52) U.S. Cl.
    CPC ........ *G06F 18/2411* (2023.01); *G06F 16/285* (2019.01)

(58) Field of Classification Search
    CPC ........................... G06F 18/2411; G06F 16/285
    USPC ......................................................... 707/739
    See application file for complete search history.

(56)                References Cited

U.S. PATENT DOCUMENTS 10,007,679 B2 *  6/2018  Guo ....................... G06F 18/253
                                                              707/707
    12,099,526 B1 *  9/2024  Smith ................... G06F 16/951
                                                              707/707
    12,393,595 B1 *  8/2025  Browder ............... G06F 16/285
                                                              707/707

2010/0306249 A1 * 12/2010 Hill ...................... G06F 16/9535
                                                              707/769
    2018/0150547 A1 *  5/2018 Pallath ................... G06N 20/20
                                                              707/707
    2019/0236371 A1 *  8/2019 Boonmee ............. G06V 10/764
                                                              707/707
    2021/0012116 A1 *  1/2021 Urtasun ................... G06N 3/09
                                                              707/707
    2021/0256538 A1 *  8/2021 Butvinik ............... G06N 20/00
                                                              707/707
    2022/0124543 A1 *  4/2022 Orhan ................. H04W 28/021
                                                              707/707
    2022/0137985 A1 *  5/2022 Murugan .................. G06F 8/65
                                                              713/100
    2023/0017966 A1 *  1/2023 Skoff ..................... E21B 44/00
                                                              707/707

(Continued)

*Primary Examiner* — Alexandria Y Bromell

(57)                ABSTRACT

The present disclosure relates to a method and a system for filtering feedback on data labels in a machine learning model. The method comprises receiving a new data object for one or more embedding spaces, the new data object having an embedding and each embedding space includes one or more clusters of data objects having a predefined label and an anchor embedding, generating a prediction label for the new data object, receiving a feedback label based on the prediction label, identifying, based on the feedback label, the new data object with at least one cluster of the data objects in the embedding space, determining, based on a pre-defined threshold, proximity of the embedding of the new data object with the anchor embedding of the at least one cluster, and classifying the feedback label as any one of high-quality feedback or low-quality feedback based on the proximity, wherein when the feedback label is classified as high-quality feedback, updating the prediction label with the feedback label, and when the feedback label is classified as low-quality feedback, discarding the feedback label.

16 Claims, 9 Drawing Sheets

(56)               References Cited

U.S. PATENT DOCUMENTS

2024/0346029 A1* 10/2024 Neumann ............... G06F 9/451
                                                707/707

* cited by examiner

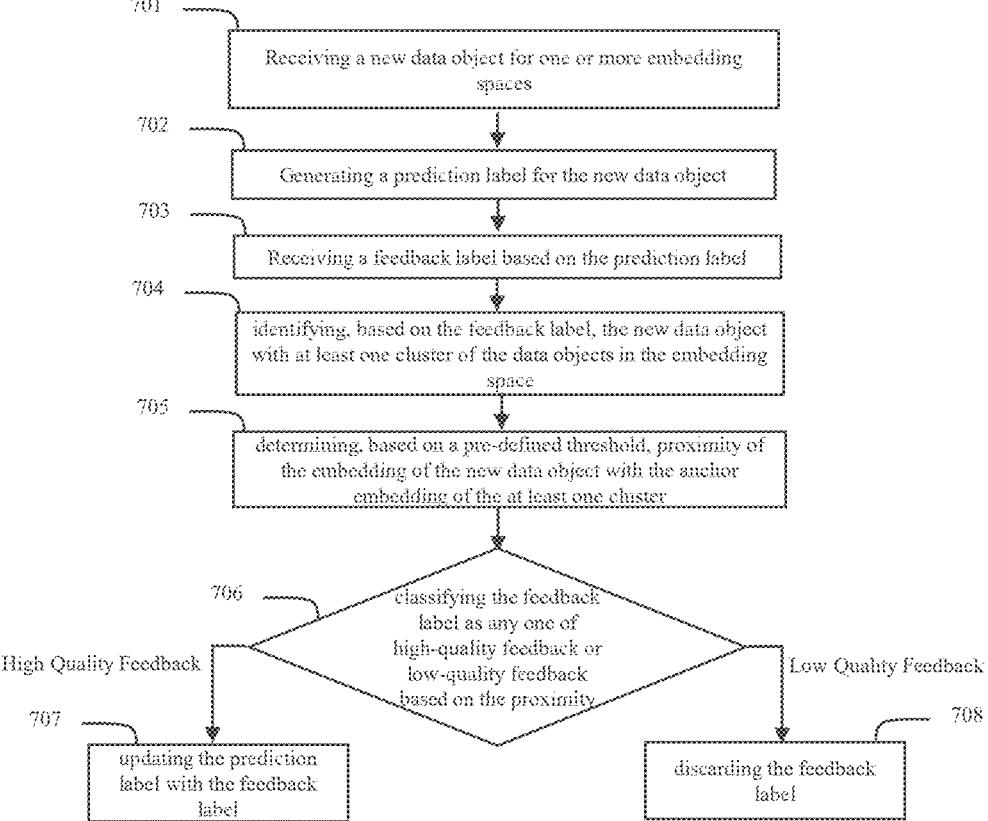

701 — Receiving a new data object for one or more embedding spaces

702 — Generating a prediction label for the new data object

703 — Receiving a feedback label based on the prediction label

704 — identifying, based on the feedback label, the new data object with at least one cluster of the data objects in the embedding space 705 — determining, based on a pre-defined threshold, proximity of the embedding of the new data object with the anchor embedding of the at least one cluster 706 — classifying the feedback label as any one of high-quality feedback or low-quality feedback based on the proximity High Quality Feedback Low Quality Feedback 707 — updating the prediction label with the feedback label 708 — discarding the feedback label

Fig. 7

801 If proximity of the embedding of new data object with the anchor embeddings is below a pre-defined threshold 802 Creating a new cluster to include the new data object to the embedding space 803 Identifying the embedding of the new data object as the anchor embedding of new cluster

METHOD AND A SYSTEM FOR FEEDBACK FILTERING IN A MACHINE LEARNING MODEL

TECHNICAL FIELD

The present disclosure generally relates to improving quality of data for training machine learning models. More specifically, the present disclosure relates to a method and a system for filtering feedback on data labels for a machine learning model.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Recent years have witnessed significant growth in use of machine learning (ML) models for performing different operations on large amounts of data, and are being used increasingly in different domains to automate various tasks. The efficiency and robustness of an ML model depends on the quality of its training data. The quality of output of ML models primarily depends upon the data or clusters of data upon which the ML model executes and therefore, it is crucial that labels associated with data stored in embedding space of an ML model is accurate. Conventionally, whenever a new data is received by a machine learning model, the machine learning may generate a data label. Data labels provide useful information to the ML models that enables them to perform various operations. For example, in an ML model related to image processing, data labelling helps in identifying the type of an object in an image. Thus, a high quality of data labelling is desirable to ensure that the ML model does not give unexpected outputs and maintains its quality over a large amount of data. In order to reduce probability of incorrect labelling, data labelling process often entails a review of the generated data label by a user (manual feedback) so that data is labelled accurately. Sometimes, multiple levels of feedbacks are provided to ensure high quality of data labelling.

Existing techniques related to providing feedback on data labels are costly and require a lot of time. Further, since manual feedback may be erroneous or biased, there is a possibility that different users reviewing data labels may suggest different corrections on generated data labels which may lead to deterioration of the quality and robustness of the ML model. One of the methods to avoid such scenarios is to provide a reviewing mechanism of a user feedback. However, such a method would further escalate costs since more human resources would be required to do further reviews of the data labels.

Most of the existing techniques of providing manual feedback on data labels relate to providing feedback on domain-specific data. An ML model trained on domain-specific data would require manual feedback afresh on data labels if new input data is of a different domain even in cases where domains may share some common characteristics, which further increases costs associated with training a machine learning model.

Accordingly, there is a need for providing a method and a system for feedback filtering in a machine learning (ML) model that enables generalization of a ML model trained on domain-specific data and allows for sharing feedback in data labelling of data objects of different domains. The filtering of the feedback on generated data labels would also decrease the overall costs involved in maintaining high quality of data labels because only a feedback which is above a certain quality would be applied on the data labels generated by a machine learning model.

Through applied effort, ingenuity, and innovation, the inventors have solved the above problem(s) by developing the solutions embodied in the present disclosure, the details of which are described further herein.

SUMMARY

In general, embodiments of the present disclosure herein provide a method and a system for filtering feedback on generated data labels for a machine learning model. Other implementations will be, or will become, apparent to one with skill in the art upon examination of the following figures and detailed description. It is intended that all such additional implementations be included within this description be within the scope of the disclosure and be protected within the scope of the following claims.

In one embodiment, the present disclosure provides a method for feedback filtering in a machine learning (ML) model, comprising receiving a new data object for one or more embedding spaces, the new data object having an embedding and each embedding space includes one or more clusters of data objects having a predefined label and an anchor embedding, generating a prediction label for the new data object, receiving a feedback label based on the prediction label, identifying, based on the feedback label, the new data object with at least one cluster of the data objects in the embedding space, determining, based on a pre-defined threshold, proximity of the embedding of the new data object with the anchor embedding of the at least one cluster and classifying the feedback label as any one of high-quality feedback or low-quality feedback based on the proximity, wherein when the feedback label is classified as high-quality feedback, updating the prediction label with the feedback label, and when the feedback label is classified as low-quality feedback, discarding the feedback label.

In an embodiment, the method further comprises creating a new cluster to include the new data object to the embedding space, based on determination that the proximity of the embedding of the new data object with the anchor embeddings of the embedding space is below the pre-defined threshold and identifying the embedding of the new data object as the anchor embedding for the new cluster.

In another embodiment, the method further comprises providing an intimation of the quality of the feedback to the at least one user.

In another embodiment, the one or more embedding spaces pertain to one or more domains.

In another embodiment, the method further comprises storing the new data object to one or more clusters of data objects in each of the embedding spaces, based on a determination that the embedding of the new data object is proximate to one or more anchor embeddings of the one or more embedding spaces.

In another embodiment, the data objects of the one or more domains are accessible to the ML model through a data fabric architecture.

In another embodiment, the quality of the feedback is determined by cosine similarity between the embedding of the new data object and the anchor embedding.

In another embodiment, the method further comprises storing the feedback label with high quality feedback in a pool.

In yet another embodiment, the feedback label is any one of a corrected prediction label and a verified prediction label.

In another embodiment, the present disclosure provides a system for feedback filtering in a machine learning (ML) model, comprising a processor, a memory storing program instructions which, when executed by the processor, causes the processor to receive a new data object for one or more embedding spaces, the new data object having an embedding and each embedding space includes one or more clusters of data objects having a predefined label and an anchor embedding, generate a prediction label for the new data object, receive a feedback label based on the prediction label, identify, based on the feedback label, the new data object with at least one cluster of the data objects in the embedding space, determine, based on a pre-defined threshold, proximity of the embedding of the new data object with the anchor embedding of the at least one cluster, and classify the feedback label as any one of high-quality feedback or low-quality feedback based on the proximity, wherein when the feedback label is classified as high-quality feedback, update the prediction label with the feedback label, and when the feedback label is classified as low-quality feedback, discard the feedback label.

In another embodiment, the processor is further configured to create a new cluster to include the new data object to the embedding space, based on determination that the proximity of the embedding of the new data object with the anchor embeddings of the embedding space is below the pre-defined threshold and identify the embedding of the new data object as the anchor embedding for the new cluster.

In another embodiment, the processor is further configured to receive the feedback label from at least one user based on the prediction label.

In another embodiment, the processor is further configured to provide an intimation of the quality of the feedback to the at least one user.

In yet another embodiment, the processor is further configured to store the new data object to one or more clusters of data objects in each of the embedding spaces, based on a determination that the embedding of the new data object is proximate to one or more anchor embeddings of the one or more embedding spaces.

In yet another embodiment, the processor is further configured to store the feedback label with high quality feedback in a pool.

In yet another embodiment, the present disclosure provides a non-transitory computer-readable storage medium storing program instructions for feedback filtering in a machine learning (ML) model, the instructions, when executed, perform the steps of: receiving a new data object for one or more embedding spaces, the new data object having an embedding and each embedding space includes one or more clusters of data objects having a predefined label and an anchor embedding, generating a prediction label for the new data object, receiving a feedback label based on the prediction label, identifying, based on the feedback label, the new data object with at least one cluster of the data objects in the embedding space, determining, based on a pre-defined threshold, proximity of the embedding of the new data object with the anchor embedding of the at least one cluster, and classifying the feedback label as any one of high-quality feedback or low-quality feedback based on the proximity, wherein when the feedback label is classified as high-quality feedback, updating the prediction label with the feedback label, and when the feedback label is classified as low-quality feedback, discarding the feedback label.

The above summary is provided merely for the purpose of summarizing some exemplary embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
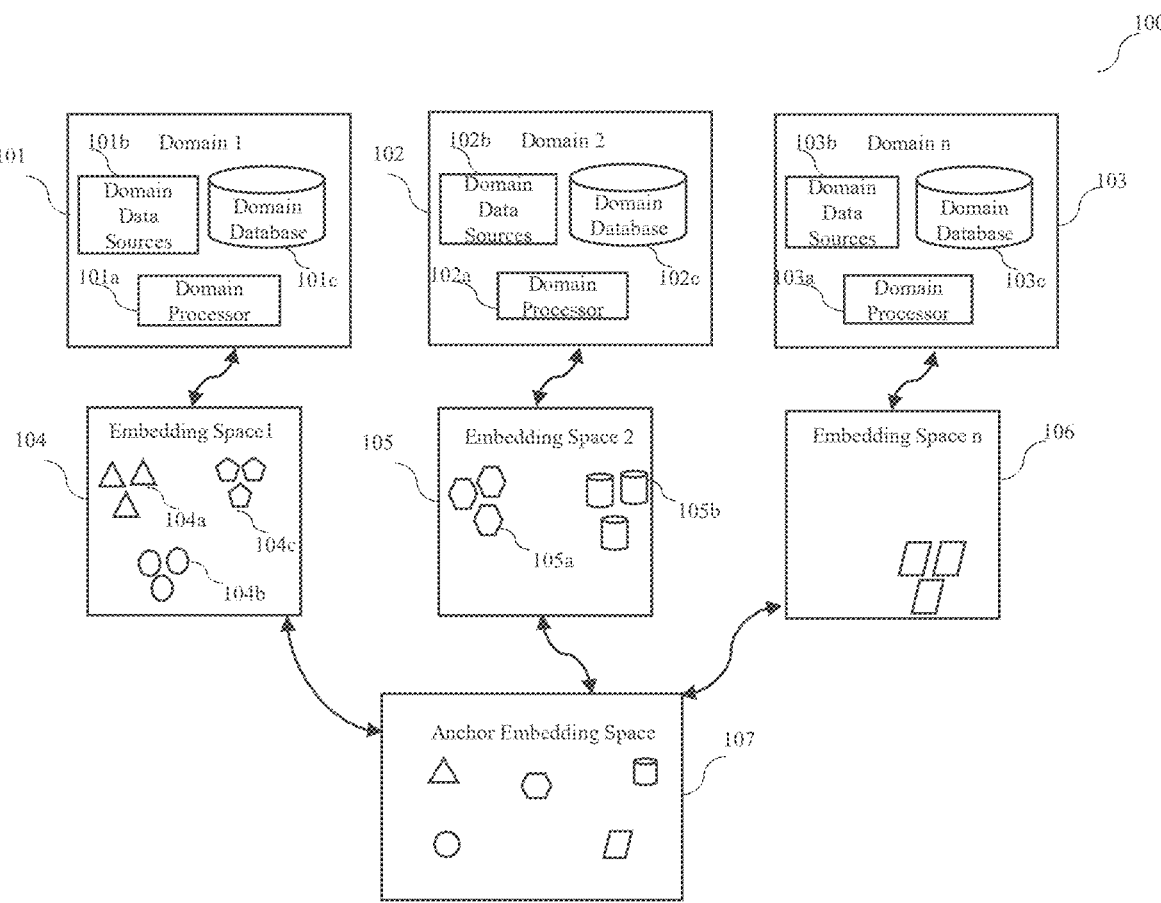
Figure 2:
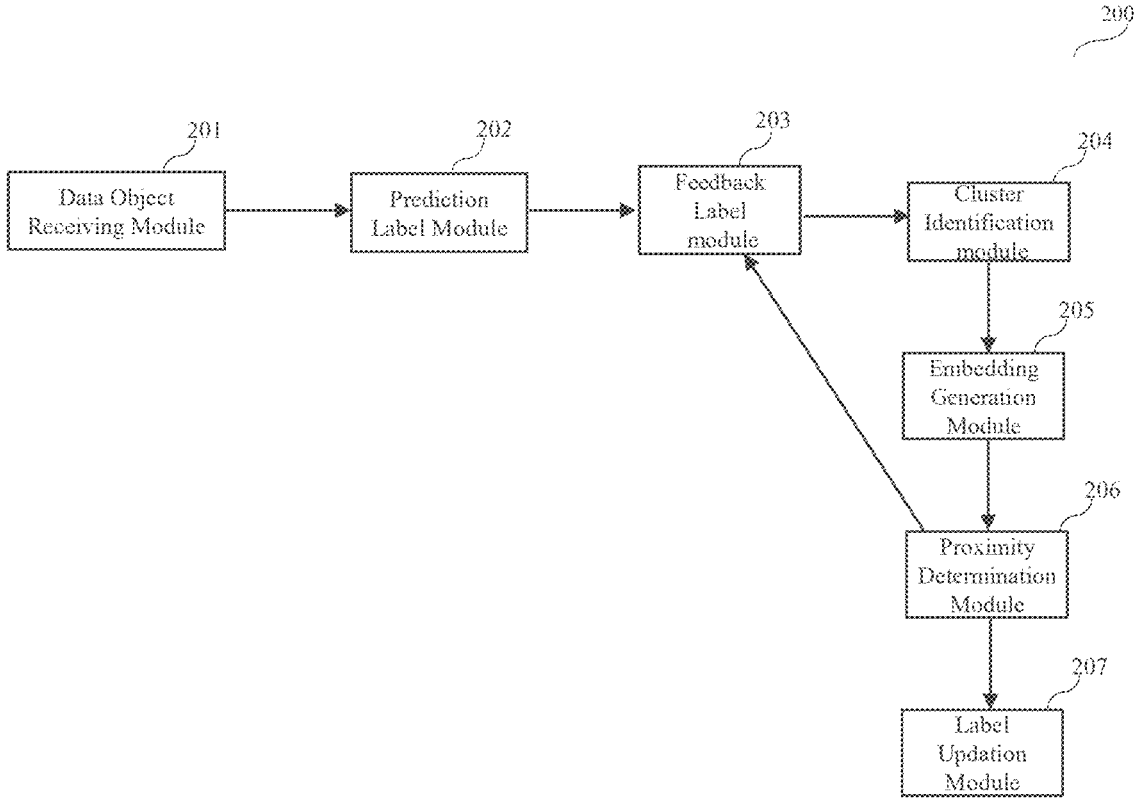
Figure 3:
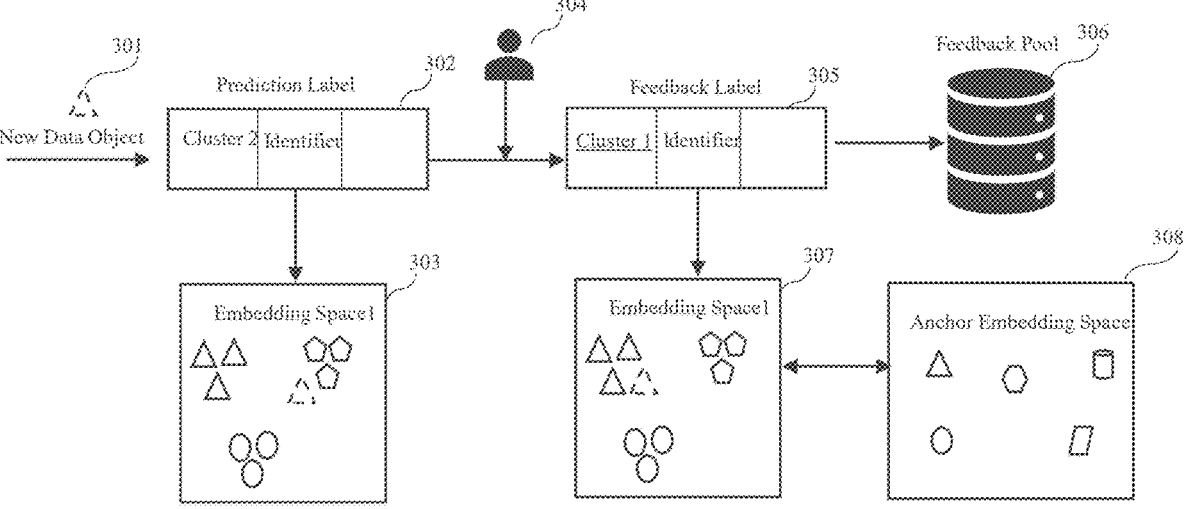
Figure 4:
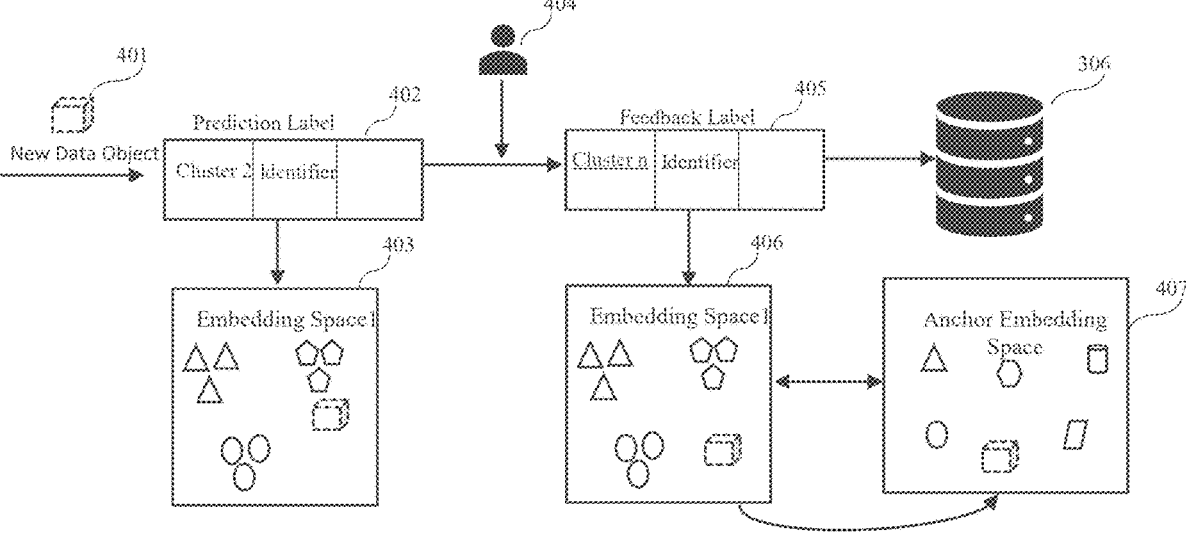
Figure 5:
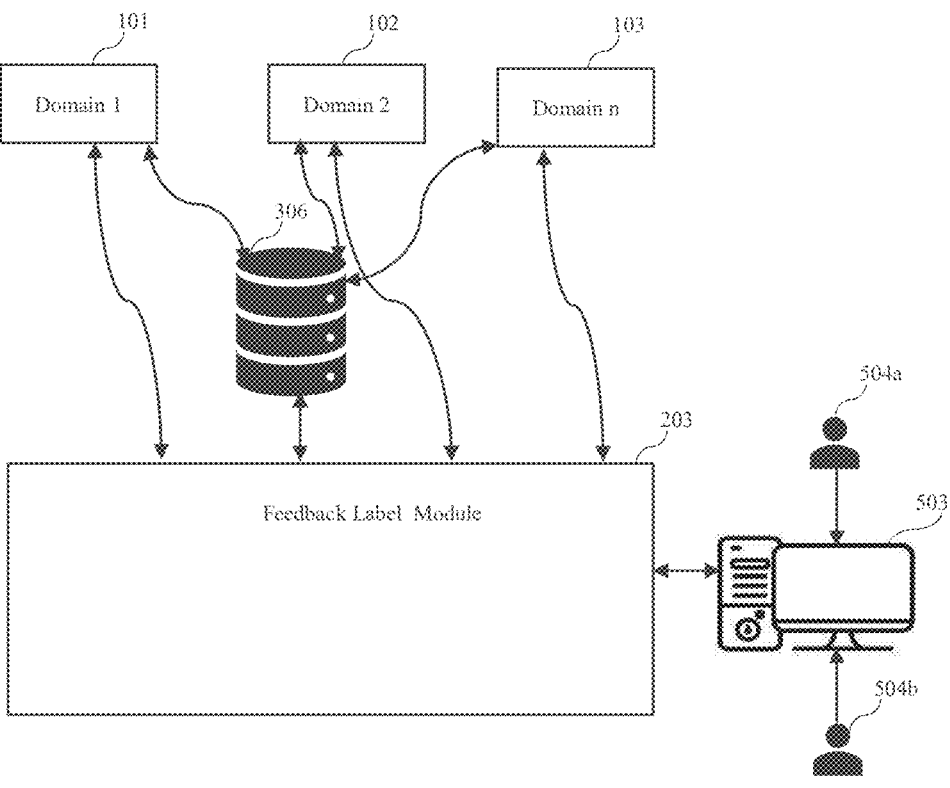

Having thus described the embodiments of the disclosure in general terms, reference now will be made to the accompanying drawings, which are not necessarily drawn to scale, and wherein:

FIG. 1 illustrates an architecture of a system for feedback filtering for a machine learning (ML) model, in accordance with an embodiment of the present disclosure;

FIG. 2 illustrates a detailed block diagram of the system, in accordance with an embodiment of the present disclosure;

FIG. 3 illustrates a detailed block diagram of data label updation based on high-quality feedback, in accordance with an embodiment of the present disclosure;

FIG. 4 illustrates a detailed block diagram of data label updation when a cluster of the new data object is not present in an embedding space, in accordance with an embodiment of the present disclosure;

FIG. 5 illustrates a block diagram of module-based operation of feedback receiving and feedback label generation, in accordance with an embodiment of the present disclosure.

Figure 6:
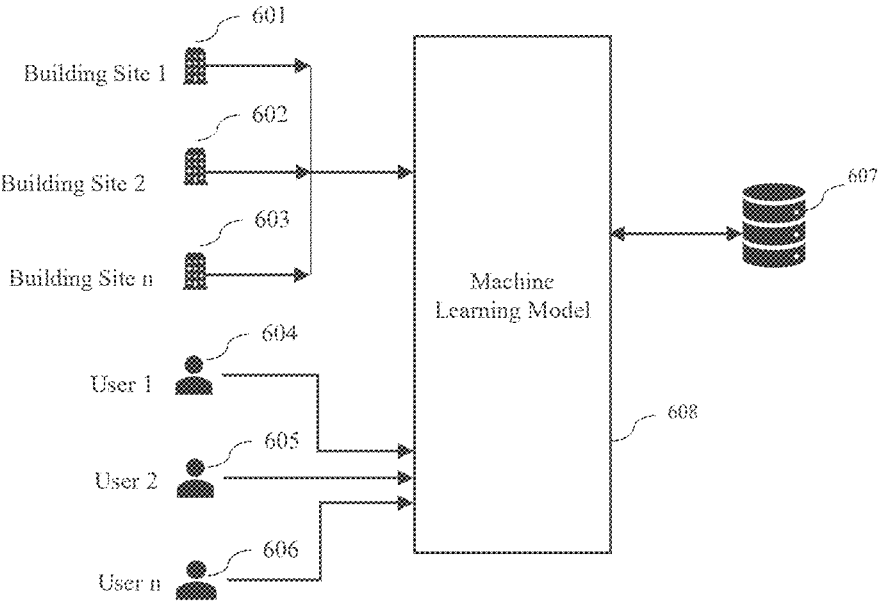
Figure 8:
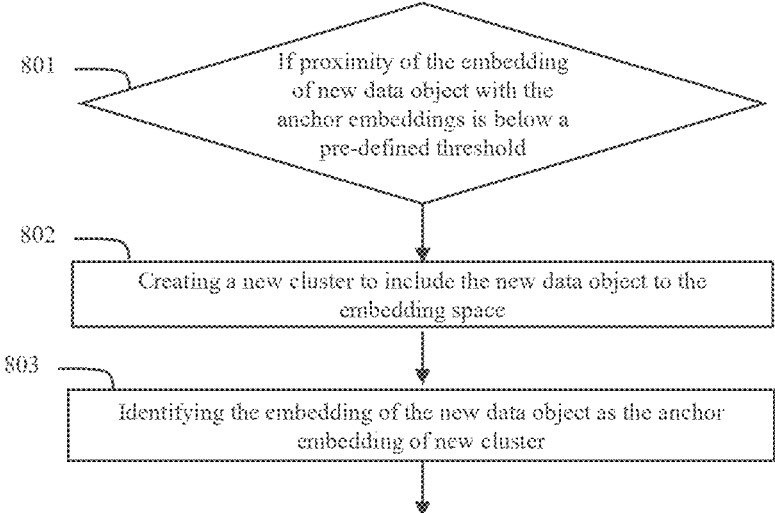
Figure 9:
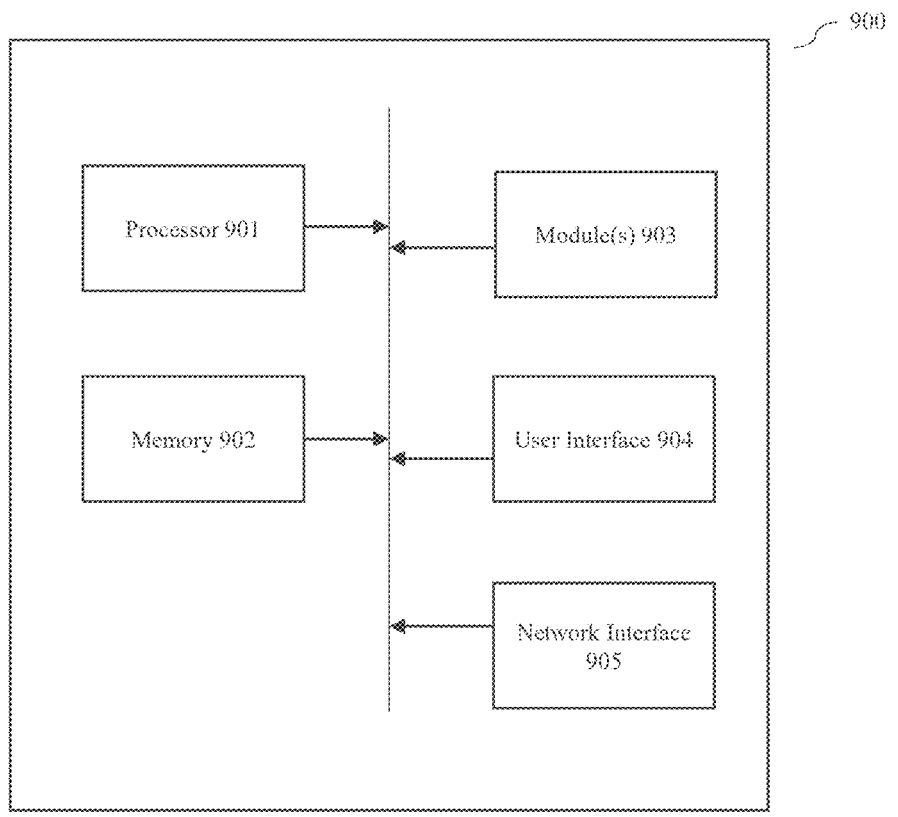

FIG. 6 illustrates a detailed block diagram of processing of data objects from a plurality of domains, in accordance with an embodiment of the present disclosure;

FIG. 7 illustrates a method for feedback filtering in a machine learning (ML) model, in accordance with an embodiment of the present disclosure;

FIG. 8 illustrates a method for feedback filtering in a machine learning (ML) model, in accordance with another embodiment of the present disclosure; and FIG. 9 illustrates a block diagram of components of a system in accordance with an embodiment of the present disclosure.

DETAILED DESCRIPTION OF THE INVENTION

The detailed description set forth below in connection with the appended drawings is intended as a description of various embodiments of the present disclosure and is not intended to represent the only embodiments in which the present disclosure may be practiced. Each embodiment described in this invention is provided merely as an example or illustration of the present disclosure, and should not necessarily be construed as preferred or advantageous over other embodiments. The detailed description includes specific details for the purpose of providing a thorough understanding of the present disclosure. However, it will be apparent to those skilled in the art that the present disclosure may be practiced without these specific details.

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

It should be noted that in the description and drawings, like or substantially similar elements may be labelled with the same reference numerals. However, sometimes these elements may be labelled with differing numerals, such as, for example, in cases where such labelling facilitates a clearer description. Additionally, the drawings set forth herein are not necessarily drawn to scale, and in some instances, proportions may have been exaggerated to more clearly depict certain features. Such labelling and drawing practices do not necessarily implicate an underlying substantive purpose. As stated above, the specification is intended to be taken as a whole and interpreted in accordance with the principles of the invention as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

The present disclosure relates to a method and a system for feedback filtering for a machine learning (ML) model. The techniques of data labelling in state of the art involve generating a data label by a machine learning model and receiving a feedback on the same by a user. Such techniques are costly since they require involvement of multiple users. Further, the manual feedback may not always result in increased quality of data labels since such feedbacks may be prone to errors.

When a new data object is received in one or more embedding spaces, the new data object is typically labelled and is moved to one or more clusters of data in the embedding space. The embedding spaces may contain embeddings of a plurality of data objects. Embeddings are used in machine learning models to convert data in a mathematical form which can be understood by a machine learning model. Embeddings allow presentation of complex data in lower-dimensional space. Embeddings also embody the relationships amongst different data objects. The existing techniques suffer from the challenges that manual feedback on data labels of data objects of a particular domain cannot be used on data objects of another domain. The method and system of the present disclosure enables classifying feedback on data labels as high quality of low-quality feedback. The filtering of feedback allows the application of feedback that is above a pre-defined threshold.

The present invention addresses the above challenges and provides an efficient way of filtering feedback on data labels. Upon receiving a new data object, the machine learning model generates a prediction label for the new data object. Thereafter, a feedback label is received on the basis of the prediction label. In one of the embodiments, the feedback label is generated by receiving a user feedback on the prediction label. Based on the feedback label, the new data object is identified with at least one cluster of data objects in the embedding space. Thereafter, the proximity of the embedding of the new data object with the anchor embedding of its cluster is determined. If the proximity of the embedding of the new data object with the anchor embedding is above a pre-defined threshold, the feedback label is classified as high-quality feedback. Conversely, if the proximity of the embedding of the new data object with the anchor embedding is below a pre-defined threshold, the feedback is classified as low-quality feedback. The method updates the generated prediction label with the feedback label when the feedback label is classified as high-quality feedback. On the other hand, when the feedback label is classified as low-quality feedback, the feedback label is discarded.

The method and system of the present disclosure thus allow for filtering of feedback and ensures that only high-quality feedback is used. The method and system of the present disclosure also application of high-quality feedback on data labelling on data objects of different domains. Thus, machine learning model trained to label data of one domain is able to apply its learning in labelling data of another domain. The forthcoming paragraphs will explain the method and system in detail in reference to accompanying figures.

FIG. 1 illustrates an architecture of a system for feedback filtering for a machine learning (ML) model, in accordance with an embodiment of the present disclosure. In an embodiment, the system 100 comprises of a plurality of domains 101, 102 and 103. Domains 101, 102 and 103 are equipped respectively with their domain processors 101a, 102a and 103a, domain data sources 101b, 102b and 103b, and domain databases 101c, 102c and 103c. Domains 101, 102 and 103 share some common properties in terms of computing environment and data sources. For example, in one of the embodiments, domains 101, 102 and 103 may comprise of similar devices. Domains 101, 102 and 103 may comprise of various data pipelines that are integrated through a data fabric architecture. The data fabric architecture enables execution of automated data operations. Domain data sources 101b, 102b and 103b in domains 101, 102 and 103 refer to various devices or assets that generate data objects.

The data object may belong to any of the domains 101, 102 and 103, and is understandable by a machine learning model.

For example, in one of the embodiments, the domain data sources 101b, 102b and 103b may comprise of various devices and systems like smart thermostats, smart locks, HVAC systems, IoT devices and sensors, lighting systems, elevators etc. In some of the embodiments, domain data sources 101b, 102b and 103b are equipped with capabilities to generate various reports related to functioning of various devices and systems of the domains 101, 102 and 103. Domain processors 101a, 102a and 103a are equipped to perform various operations on data generated by domain data sources 101b, 102b and 103b. Different kinds of data generated in domains 101, 102 and 103 are stored in their respective domain databases 101c, 102c and 103c. Such data can be stored either manually or automatically depending on the overall computing capabilities of domains 101, 102 and 103. For example, in one of the embodiments, a data source 101b comprising of a smart thermostat may transmit information like changes in temperature over a given period of time into its domain database 101c. Domains 101, 102 and 103 may further comprise of user interfaces for monitoring the functioning of domain data sources 101b, 102b and 103b.

In some of the embodiments, the domains 101, 102 and 103 are configured to integrate legacy data of older versions of domain data sources 101b, 102b and 103b with the data generated by newer versions of domain data sources 101b, 102b and 103b. Data fabric architecture allows for integrating legacy data with newer forms of data seamlessly. As a result, improved data analysis can be performed on both older and newer data generated by the domain data sources 101b, 102b and 103b.

In some of the embodiments, the domain processors 101a, 102a and 103a, the domain data sources 101b, 102b and 103b, and domain databases 101c, 102c and 103c may be connected with each other locally or remotely through a network including a cloud-based network.

The system 100 is configured to add new domains and various components of domains. Domain databases 101c, 102c and 103c store various data generated by the domain data sources 101b, 102b and 103b. The domain databases 101c, 102c and 103c are accessible by the machine learning model and its embedding spaces for receiving data objects. The domain processors 101a, 102a and 103a are configured to run program instructions to perform various operations on data stored in the domain databases 101c, 102c and 103c. For example, in some of the embodiments, the domain processors 101a, 102a and 103a are configured to convert data into data objects that can be understood by the machine learning model. The functioning of system 100 is not limited to any specific form of data generated in domains 101, 102 and 103 as long as it can be converted into data objects.

As explained earlier, each of the domains 101, 102 and 103 have their respective embedding spaces, embedding spaces 104, 105 and 106. In some of the embodiments, there may be one embedding space which is common to all the domains 101, 102 and 103 and receives data objects from the domains 101, 102 and 103. Various data objects are received in embeddings spaces 101, 105 and 106.

In an embedding space, embeddings of data objects are represented on the basis of proximity or similarity between the data objects. Thus, similar data objects belonging to a group or cluster are placed together. In the present disclosure, geometric shapes are used to illustrate data objects of different types in an embedding space. As shown in FIG. 1, in embedding space 104, data objects 104a represented by the shape "triangle" are closer to each other as compared to data objects represented by the shape "pentagon". Similarly, in the embedding space 105 of domain 102, data objects represented by the shape "hexagon" are closer to each other as compared to data objects represented by the shape "cylinder". In some of the embodiments, different shapes of data objects can be understood to be data belonging to different domain data sources 101b, 102b and 103b.

As shown in FIG. 1, each of the embedding spaces 104, 105 and 106 are configured to refer to an anchor embedding space 107. Anchor embedding space 107 contains anchor embeddings of different data objects belonging to domains 101, 102 and 103. Anchor embeddings serve as a reference embedding for one or more data objects. Anchor embeddings may be generated by a training dataset. Anchor embedding of a triangle shaped data object in the anchor embedding space 107 will be closer to the embeddings of triangle shaped data objects in the embedding space 104 as compared to the embedding of the circle shaped data objects 104b in embedding space 104. In some of the embodiments, there may be a plurality of anchor embedding spaces.

FIG. 2 illustrates a detailed block diagram of the system, in accordance with an embodiment of the present disclosure. The different modules in FIG. 2 are implemented through one or more processors along with one or more memories. The one or more memories store program instructions which are executable by the one or more processors. As shown in FIG. 2, a new data object is received by a data receiving module 201 for embedding into an embedding space 104. The data receiving module 201 is configured to identify the type of data object. For example, in some of the embodiments, the data receiving module 201 may be coupled to a database that stores program instructions related to pattern recognition among different data objects. By identifying patterns in different data objects, the data receiving module 201 may identify the type of data object.

The data receiving module 201 then sends the data object to a prediction label module 202 for generating a prediction label of the data object. The prediction label module 202 can be configured to apply a prediction label logic to generate prediction labels. The prediction label logic may assign the new data object to one or more data cluster. The prediction label module 202 may contain a database that stores program instructions related to prediction label logic. For example, in some of the embodiments, prediction label may contain fields that identify the domain, data object type, cluster and a unique identifier for each data object.

The prediction label module 202 generates a prediction label of the new data object. In some of the embodiments, the prediction label may contain information with respect to the cluster to which the new data object may belong to. The position of the new data object in the embedding space 104 may be determined by the cluster related information in the prediction label. Data objects that belong to same cluster are represented closer to each other in the embedding space 104. In some of the embodiments, the clusters of data objects may be determined by the type of domain data sources 101b, 102b and 103b to which data objects belong.

The prediction label generated by the prediction label module 202 is sent to a feedback label module 203 for receiving a feedback on the prediction label and generating a feedback label. The prediction label is presented to a user. In some of the embodiments the user may be a subject matter expert. The feedback label module 203 may be coupled to a user interface that presents the prediction label. The feedback label module 203 is configured to receive feedback in a variety of ways. In some of the embodiments, the feedback label module 203 may ask the user for verification of the prediction label. If the user verifies that the prediction label is correct then the feedback label generated by the feedback label module 203 is a verified prediction label. In some of the embodiments, the feedback label module 203 may ask for corrections on the prediction label from the user. If the user corrects the prediction label then the feedback label generated by the feedback label module 203 is a corrected prediction label. In some of the embodiments, the feedback label module 203 may present pre-defined options for selection by the user for receiving feedback. In some of the embodiments, the feedback label module 203 may also receive feedback in text form.

In some of the embodiments, the feedback module 203 may be coupled to a database that stores the details of the users and their feedbacks. In some of the embodiments, the feedback label module 203 may be configured to receive feedbacks from multiple users for data objects of domains 101, 102 and 103.

The feedback label generated by the feedback label module 203 is sent to a cluster identification module 204. The cluster identification module 204 is configured to identify a cluster to which the new data object belongs to, from the feedback label. Upon identifying the cluster, the cluster identification module 204 places the new data object in the identified cluster of data objects. In some of the embodiments, the cluster identification module 204 is configured to create a new cluster if the new data object belongs to a domain data source whose cluster is not present before.

After determination of the cluster, the cluster identification module sends the new data object to an embedding generation module 205. Upon determining that a new data object has been added to a cluster, the embedding generation module 205 generates an embedding of the new data object in the embedding space 104. The embedding generation module 205 is also configured to generate different kinds of embeddings. For example, in some of the embodiments, the embedding generation module 205 generates vector embeddings.

The embedding generation module 205 sends the embedding of the new data object with the feedback label to a proximity determination module 206. The proximity determination module 206 determines the proximity of the embedding of the new data object with anchor embedding of its cluster in the anchor embedding space 107.

The proximity determination module 206 is coupled to a database that stores a pre-defined threshold of proximity between embeddings of data objects and their anchor embeddings. The value of the threshold of proximity can be define manually or by training the machine learning model on a limited dataset. The proximity determines the quality of the feedback label.

The machine learning model is trained to consider data label in generation of embeddings. If the proximity of the embedding of the new data object with anchor embedding of the cluster of the new data object is above a pre-defined threshold then the feedback given in the feedback label module 203 is classified as high-quality. Conversely, if the proximity of the embedding of the new data object with anchor embedding of the cluster of the new data object is below the pre-defined threshold then the feedback given in the feedback label module 203 is classified as low-quality. In some of the embodiments the user is intimated of the quality of the feedback.

The proximity determination module 206 is configured to use any similarity technique. In some of the embodiments, the proximity determination module 206 determines the quality of the feedback by cosine similarity between the embedding of the new data objection and the anchor embedding of the cluster of the new data object. The result of the proximity determination module 206 is sent to a label updation module 207. The label updation module 207 updates the prediction label of the new data object with the feedback label if the determination of the proximity determination module 206 is that the feedback was of high-quality. The proximity determination module 206 is configured to send its determination of the feedback quality to the feedback label module 203. In case the proximity determination module 206 classifies the feedback as low-quality then the feedback label is discarded and the prediction label is the data label of the new data object.

Since the machine learning model is able to filter the quality of manual feedback on prediction label, it is able to maintain the quality of its data. Instead of accepting every feedback by the user, feedback filtering allows only high-quality feedback to be applied on data labels. This leads to substantial savings in costs associated with high-quality feedback.

In some of the embodiments, the new data object may not have a cluster in its embedding space 104. The cluster identification module 203 in such a case may assign the new data object to a pre-existing cluster in the prediction label. The feedback label generated by the feedback label module 203 may then be classified as low quality since proximity of the embedding of the new data object with the anchor embedding of the cluster assigned by the prediction label or feedback label will be below the pre-defined threshold. In such a case, the proximity determination module 206 may determine proximities of the embedding of the new data object with the anchor embeddings in the anchor embedding space 107. If all the proximities are below the pre-defined threshold then it is determined that the anchor embedding space 107 does not contain an anchor embedding of a cluster to which the new data object will belong to. A new cluster is created in the embedding space 104 and the new data object is embedded in the embedding space. The embedding of the new data object in the embedding space 104 is added to the anchor embedding space 107.

Since the anchor embedding space 107 is accessible to domains 102 and 103 also, the anchor embedding of the new data object will be available for filtering feedback in the embedding spaces 105 and 106 also. In some of the embodiments, the new data object is added to the clusters of data objects in the embedding spaces 105 and 106 of domains 102 and 103 respectively. Thus, the high-quality feedback of one domain can be utilized by another domain thereby enhancing the cross domain learning capabilities of the machine learning model.

FIG. 3 illustrates a detailed block diagram of data label updation based on feedback, in accordance with an embodiment of the present disclosure. As shown in FIG. 3 the new data object 301 is received in the embedding space 303. The prediction label 302 is generated by the prediction label module 202. The prediction label 302 may contain different fields that labels the new data object 301. For example, in some of the embodiments, the prediction label 302 may contain a field that identifies the cluster to which the new data object 301 belongs to. In some of the embodiments, the prediction label 302 may also contain a field identifying the domain to which a data object belongs to.

As shown in FIG. 3, the prediction label 302 identifies that the new data object 301 belongs to a cluster related to pentagon shaped data objects. As a result, the new data object 301 is placed in the embedding space 303 nearer to the cluster of pentagon shaped data objects. The distance of the new data object 301 from the cluster of triangle shaped data objects indicate that the machine learning model understands that the new data object 301 is less similar to the triangle shaped data object as compared to the pentagon shaped data objects.

After the generation of the prediction label 302, the user 304 provides a feedback on the prediction label 302. As shown in FIG. 3, the user 304 changes only the cluster field of the prediction label 302. As a result, a feedback label 305 indicates that the new data object 301 belongs to "cluster 1" which is the cluster related to the triangle shaped data objects.

After the generation of the feedback label 305, the position of the new data object 301 shifts in an embedding space 307, as shown in FIG. 3. The new data object 301 is now positioned nearer to the cluster of triangle shaped objects. The embedding of the new data object 301 is compared with the embedding of triangle shaped cluster in the anchor embedding space 308 to determine proximity. The machine learning model selects an anchor embedding amongst several anchor embeddings in the anchor embedding space 308 on the basis of the cluster in which the embedding of the new data object is present in the embedding space 307. The proximity determination is done to identify if the feedback that was given by the user 304 was of high-quality. The feedback is classified as high quality if the proximity of the embedding of the new data object 301 in the embedding space 307 with the anchor embedding in the anchor embedding space 308 is above a pre-defined threshold. As shown in FIG. 3, since the new data object 301 is placed near to the data objects in the triangle shaped cluster in the embedding space 307, its embedding will be very close to the anchor embedding of the triangle shaped cluster in the anchor embedding space 308. As a result, the feedback is classified as high-quality.

Upon determination that the feedback given by the user 304 was of high-quality, the prediction label 302 is updated by the feedback label 305. The feedback labels with high quality feedback is stored in a feedback pool 306. In some of the embodiments, the feedback pool 306 can be accessed by the embedding spaces of domains 101, 102 and 103. In this way, the high quality feedback is made available to different domains.

The anchor embeddings in the anchor embedding space 308 can be generated by training the machine learning model on few datasets. In one of the embodiments, the machine learning model generates vector embeddings of data objects that reflect the relationship among them. For example, in some of the embodiments, a vector embedding for one of the triangle shaped data objects may be represented as below:

| 0.756 | 0.158 | 0.172 | . . . | 0.698 | 0.215 | 0.672 |
| --- | --- | --- | --- | --- | --- | --- |

For every data object belonging to the triangle shaped cluster, the vector embedding will have one field whose value would be very close to the one field of above embedding. This representation also allows for performing various data operations like proximity determination on the embeddings.

FIG. 4 illustrates a detailed block diagram of data label updation when a cluster of the new data object is not present in an embedding space, in accordance with an embodiment of the present disclosure. As shown in FIG. 4, a new data object 401 which is indicated by cube shape is received by the data receiving module 201 and sent to the prediction label module 202 for generation of a prediction label 402. As shown in FIG. 4, the machine learning model identifies that the new data object 401 belongs to pentagon shaped cluster. As a result, the embedding of the new data 401 is nearer to the pentagon shaped cluster in the embedding space 403.

The user 404 gives feedback on the prediction label 402 in the feedback label module 203 and upon the basis of the feedback of the user 404, a feedback label 405 is generated. The cluster identification module 204 identifies from the feedback label 405 that the new data object 401 does not belong to any of the existing cluster. The cluster identification module 204 creates a new cluster for the new data object 401. Thereafter an embedding of the new data object 401 is generated by the embedding generation module 205 in the embedding space 406.

In order to determine the quality of the user feedback, the proximity determination module 206 is configured to compare the proximity of the embedding of the new data object 401 in the embedding space 406 with the anchor embedding of the cube shaped cluster in an anchor embedding space 407. However, the anchor embedding space 407 may not contain the anchor embedding of the cube shaped cluster. In such a case, the proximity determination module 206 determines the proximity of the embedding of the new data object 401 in the embedding space 406 with all the anchor embeddings in the anchor embedding space 407.

If the proximity determination module 206 determines that proximity of the embedding of the new data object 401 in the embedding space 406 with all anchor embeddings in the anchor embedding space 407 is below a pre-defined threshold, then the proximity determination module 206 determines that the new data object 401 belongs to a new cluster that was not known to the machine learning model previously. In such a case, the proximity determination module 206 adds the embedding of the new data object 401 in the embedding space 406 to the anchor embedding space 407. Thus, the embedding of the new data object 401 also becomes an anchor embedding for future data objects that will belong to the cube shaped cluster. Such a feedback will also be classified as high-quality feedback since the user 404 had used his/her expertise in labelling of data object 401 in the case where there was no pre-existing cluster.

FIG. 5 illustrates a block diagram of module-based operation of feedback receiving and feedback label generation, in accordance with an embodiment of the present disclosure. As shown in FIG. 5, the feedback label module 203 is coupled to a feedback pool 306 where the feedback labels with high quality feedback are stored. The feedback label module 203 receives the prediction label 402 so that a user 304 can give feedback. The embodiments of the present invention are not limited to receiving feedback from only one user and multiple users like users 504a and 504b can give feedback on the prediction label 302. In some of the embodiments, users 504a and 504b can be subject matter experts whose expertise in domain specific knowledge can be used in labelling process. In some of the embodiments, the user 504a can verify the prediction label generated by the prediction label module 202. If the user 504a does not suggest any changes to the prediction label the feedback label generated by the feedback label module 203 would be a verified prediction label. In some of the embodiments, if the user 504a changes the prediction label by giving feedback then the feedback label generated by the feedback label module 203 would be a corrected prediction label. In some of the embodiments, the user 504*a* can review the feedback given by the user 504*b*.

The feedback label module 203 is coupled via a network to a user interface 503 that presents the prediction label 302 to the users 504*a* and 504*b* for receiving their feedback. The feedback label module 203 is configured to receive feedback in a variety of ways. In some of the embodiments, the user interface 503 may present pre-defined options for selection by the user 504*a*. In some of the embodiments, the user interface 503 may also receive feedback in text form.

The user interface 503 is also configured to intimate the quality of the feedback to the users 504*a* and 504*b* as determined by the proximity generation module 206. This may help users 504*a* and 504*b* to augment their learning.

The feedback pool 306 stores the feedback labels with high quality feedback. It is also configured to store details of all users authorized to give feedback on the prediction label 302. In some of the embodiments, the feedback pool 306 may also store parameters indicating the relative qualities of feedback of the users 504*a* and 504*b*. For instance, the feedback pool 306 may record the number of times the feedback of each user is classified as high-quality. The feedback pool 306 is also configured to generate performance reports for the users 504*a* and 504*b* This would allow a systems administrator to make decisions with respect to proficiency of users 504*a* and 504*b*.

As shown in FIG. 5, the feedback pool 306 is accessible to different domains 101, 102 and 103. In some of the embodiments where each of the domains 101, 102 and 103 generate different kinds of data objects, access to the feedback pool 306 helps in cross-domain learning and generalization of machine learning model over a plurality of domains.

The feedback pool 306 is also configured to store values above the pre-defined threshold of proximity with respect to each feedback. In some of the embodiments, the pre-defined threshold value in the proximity generation module 206 may be updated on the basis of values from the feedback pool 306.

FIG. 6 illustrates a detailed block diagram of processing of data objects from a plurality of domains, in accordance with an embodiment of the present disclosure. FIG. 6 illustrates an embodiment where data objects from a plurality of building sites 601, 602 and 603 are processed by a machine learning model 608. In some of the embodiments, different users 604, 605 and 606 may be assigned for giving feedback on prediction labels of data objects. The feedback labels with high-quality feedback from the users 604, 605 and 606 are stored in a feedback pool 607 which is accessible to the machine learning model 608 for feedback filtering.

The building sites 601, 602 and 603 may contain a plurality of devices and systems like smart thermostats, smart locks, HVAC systems, IoT devices and sensors, lighting systems, elevators etc. that generates data in various forms. The machine learning model 608 processes the data to perform any further data operations. Since the machine learning model 608 applies the feedback filtering techniques described in the present invention, data objects are labelled accurately by utilizing the high quality manual feedback stored in relation to data labelling of data objects of one building site like building site 601 to data labelling of data objects to another building site like building site 603. Various devices and processing components in building sites 601, 602 and 603 are connected through a data fabric architecture.

FIG. 7 illustrates a method for feedback filtering in a machine learning (ML) model, in accordance with an embodiment of the present disclosure. The step 701 involves receiving a new data object for one or more embedding spaces. The new data object has an embedding. Embeddings of the data objects are present in the embedding space in clusters. Data objects belonging to same cluster are closer to each other as compared to data objects belonging to different clusters. Each data object has a predefined label and an anchor embedding. Anchor embeddings serve as a reference embedding for data objects belonging to same cluster. In some of the embodiments, one or more embedding spaces may pertain to one or more domains. The domains may contain different data sources that generates data objects to be input in the machine learning model. The data objects of different data sources belonging to different domains may be accessible to the machine learning model through a data fabric architecture.

The step 702 involves generating a prediction label for the new data object. The prediction label is generated by the machine learning model. The prediction label may contain fields that include information with respect to the cluster to which the new data object belongs to.

The step 703 involves receiving a feedback label based on the prediction label. The feedback on the prediction label is given by a user who in some of the embodiments may also be a subject matter expert. The user may give feedback in different manners. Feedback may be given by changing the field of the prediction label that includes information related to the cluster of the new data object. Alternatively, in some of the embodiments, feedback may be given by selecting one of many pre-defined options.

The step 704 involves identifying the new data object with at least one cluster of the data objects in the embedding space on the basis of feedback label.

The step 705 involves determining based on a pre-defined threshold, proximity of the embedding of the new data object with anchor embedding of the cluster associated with the new data object.

The step 706 involves classifying the feedback label as high-quality feedback or low-quality feedback. If the proximity between the embedding of the new data object and its anchor embedding is above a pre-defined threshold, then the feedback is classified as high-quality feedback. The feedback label with high-quality feedback is stored in a pool which can be accessed by embedding spaces of different domains for receiving data objects. The feedback may be given by more than one users on the prediction label. One user may verify the feedback given by another user. In such a case the feedback label may be a verified prediction label. The user is provided an intimation of the quality of the feedback through a user interface.

The step 707 involves updating the prediction label with the feedback label if the feedback in step 706 was classified as high-quality feedback.

The step 708 involves discarding the feedback label if the feedback in step 706 was classified as low-quality feedback.

FIG. 8 illustrates a method for feedback filtering in a machine learning (ML) model, in accordance with another embodiment of the present disclosure. The step 801 involves determining if proximity of the embedding of the new data object with all the anchor embeddings is below a pre-defined threshold. If the determination in the step 801 is positive then it implies that that the new data object received in the embedding space cannot be assigned to any cluster in the embedding space.

The step 802 involves creating a new cluster in the embedding space to include the new data object to the embedding space.

The step 803 involves identifying the embedding of the new data object as the anchor embedding of the new cluster. The embedding of the new data object is also added to the anchor embedding space. In some of the embodiments, the new data object is added to the clusters of data objects in the embedding spaces of different domains.

FIG. 9 illustrates a block diagram of a components of a system 900 in accordance with an embodiment of the present disclosure. The system 900 comprises a processor 901, a memory 902, a module(s) 903, a user interface 904 and a network interface 905. The module(s) 903 here refer to a plurality of modules explained in the present disclosure. The module(s) 903 contain various sub-modules that execute the method steps described in the present disclosure. The memory 902 may contain program instructions which can be executed by the processor 901 to carry out the method steps of the machine learning model disclosed in the present disclosure. The memory 902 may also store the feedback pool containing the feedback labels with high quality feedback. The network interface 905 comprises various hardware/software components through which the users and various domains connect to the system 900. The feedback can be given by the user using the user interface 904. Further, the quality of the feedback can be intimated to the user through the user interface 904.

In some embodiments, the processor 901 includes hardware, software, firmware, and/or a combination thereof that performs one or more operations described herein. The processor 901 may be configured to execute instructions stored in the memory 902 or otherwise accessible to the processor 901. Alternatively, the processor 901 may be configured to execute hard-coded functionality. As such, whether configured by hardware or software methods, or by a combination thereof, processor 901 may represent an entity (e.g., physically embodied in circuitry) capable of performing operations according to embodiments of the present disclosure while configured accordingly.

Alternatively, the processor 901 may be embodied as an executor of software instructions, and the instructions may specifically configure the processor 901 to perform the various algorithms embodied in one or more operations described herein when such instructions are executed. In some embodiments, the processor 901 includes hardware, software, firmware, and/or a combination thereof that performs one or more operations described herein. In some embodiments, the processor 901 (and/or co-processor or any other processing circuitry assisting or otherwise associated with the processor) is/are in communication with the memory 902 via a bus for passing information. Memory 902 may be non-transitory and may include, for example, one or more volatile and/or non-volatile memories. In some embodiments, the memory 902 includes or embodies an electronic storage device (e.g., a computer readable storage medium). In some embodiments, the memory 902 is configured to store information, data, content, applications, instructions, or the like, for enabling processor 901 to carry out various operations and/or functions in accordance with example embodiments of the present disclosure.

An interface may be used to provide input or fetch output from the system. The interface may be implemented as a Command Line Interface (CLI), Graphical User Interface (GUI). Further, Application Programming Interfaces (APIs) may also be used for remotely interacting with edge systems and cloud servers.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is no limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

In some embodiments, the network may be a public network (e.g., the Internet), a private network (e.g., an internal localized, or closed-off network between particular devices). In some other embodiments, the network may be a hybrid network (e.g., a network enabling internal communications between particular connected devices and external communications with other devices). In various embodiments, the network may include one or more relay(s), router(s), switch(es), routing station(s), and/or the like.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed:

1. A method for feedback filtering in a machine learning (ML) model, comprising:
    receiving a new data object for one or more embedding spaces, the new data object having an embedding and each embedding space includes one or more clusters of data objects having a predefined label and an anchor embedding;
    generating a prediction label for the new data object;
    receiving a feedback label based on the prediction label;
    identifying, based on the feedback label, the new data object with at least one cluster of the data objects in the embedding space;

wherein the one or more embedding spaces pertain to one or more domains;
    wherein the data objects of the one or more domains are accessible to the ML model through a data fabric architecture;
    determining, based on a pre-defined threshold, proximity of the embedding of the new data object with the anchor embedding of the at least one cluster; and
    classifying the feedback label as any one of high-quality feedback or low-quality feedback based on the proximity, wherein
    when the feedback label is classified as high-quality feedback, updating the prediction label with the feedback label, and
    when the feedback label is classified as low-quality feedback, discarding the feedback label.

2. The method of claim 1, further comprising:
    creating a new cluster to include the new data object to the embedding space, based on determination that the proximity of the embedding of the new data object with the anchor embeddings of the embedding space is below the pre-defined threshold; and
    identifying the embedding of the new data object as the anchor embedding for the new cluster.

3. The method of claim 1, further comprising:
    receiving the feedback label from at least one user based on the prediction label.

4. The method of claim 3, further comprising:
    providing an intimation of the quality of the feedback to the at least one user.

5. The system of claim 1, wherein the processor is further configured to:
    storing the new data object to one or more clusters of data objects in each of the embedding spaces, based on a determination that the embedding of the new data object is proximate to one or more anchor embeddings of the one or more embedding spaces.

6. The method of claim 1, wherein the quality of the feedback is determined by cosine similarity between the embedding of the new data object and the anchor embedding.

7. The method of claim 1, further comprising:
    storing the feedback label with high quality feedback in a pool.

8. The method of claim 1, wherein the feedback label is any one of a corrected prediction label and a verified prediction label.

9. A system for feedback filtering in a machine learning (ML) model, comprising:
    a processor;
    a memory storing program instructions which, when executed by the processor, causes the processor to:
    receive a new data object for one or more embedding spaces, the new data object having an embedding and each embedding space includes one or more clusters of data objects having a predefined label and an anchor embedding;
    wherein the one or more embedding spaces pertain to one or more domains;
    wherein the data objects of the one or more domains are accessible to the ML model through a data fabric architecture;
    generate a prediction label for the new data object;
    receive a feedback label based on the prediction label;
    identify, based on the feedback label, the new data object with at least one cluster of the data objects in the embedding space;

determine, based on a pre-defined threshold, proximity of the embedding of the new data object with the anchor embedding of the at least one cluster; and classify the feedback label as any one of high-quality feedback or low-quality feedback based on the proximity, wherein when the feedback label is classified as high-quality feedback, update the prediction label with the feedback label, and when the feedback label is classified as low-quality feedback, discard the feedback label.

10. The system of claim 9, wherein the processor is further configured to:

create a new cluster to include the new data object to the embedding space, based on determination that the proximity of the embedding of the new data object with the anchor embeddings of the embedding space is below the pre-defined threshold; and identify the embedding of the new data object as the anchor embedding for the new cluster.

11. The system of claim 9, wherein the processor is further configured to:

receive the feedback label from at least one user based on the prediction label.

12. The system of claim 11, wherein the processor is further configured to:

provide an intimation of the quality of the feedback to the at least one user.

13. The system of claim 9, wherein the processor is further configured to:

store the new data object to one or more clusters of data objects in each of the embedding spaces, based on a determination that the embedding of the new data object is proximate to one or more anchor embeddings of the one or more embedding spaces.

14. The system of claim 9, wherein the quality of the feedback is determined by cosine similarity between the embedding of the new data object and the anchor embedding.

15. The system of claim 9, wherein the processor is further configured to:

store the feedback label with high quality feedback in a pool.

16. A non-transitory computer-readable storage medium storing program instructions for feedback filtering in a machine learning (ML) model, the instructions, when executed, perform the steps of:

receiving a new data object for one or more embedding spaces, the new data object having an embedding and each embedding space includes one or more clusters of data objects having a predefined label and an anchor embedding;

wherein the one or more embedding spaces pertain to one or more domains;

wherein the data objects of the one or more domains are accessible to the ML model through a data fabric architecture;

generating a prediction label for the new data object;

receiving a feedback label based on the prediction label;

identifying, based on the feedback label, the new data object with at least one cluster of the data objects in the embedding space;

determining, based on a pre-defined threshold, proximity of the embedding of the new data object with the anchor embedding of the at least one cluster; and classifying the feedback label as any one of high-quality feedback or low-quality feedback based on the proximity, wherein when the feedback label is classified as high-quality feedback, updating the prediction label with the feedback label, and when the feedback label is classified as low-quality feedback, discarding the feedback label.

* * * * *